(12) United States Patent
Dickerson et al.

(10) Patent No.: US 7,419,189 B2
(45) Date of Patent: Sep. 2, 2008

(54) HYDRAULIC FITTING

(75) Inventors: Steven J. Dickerson, Lake In The Hills, IL (US); Steve H. Clarke, Grayslake, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/411,340

(22) Filed: Apr. 26, 2006

(65) Prior Publication Data
US 2007/0252384 A1 Nov. 1, 2007

(51) Int. Cl.
*F16L 15/00* (2006.01)
*F16L 55/00* (2006.01)
*F16L 17/00* (2006.01)

(52) U.S. Cl. .......................... 285/89; 285/355; 285/351; 285/918; 285/143.1; 285/219

(58) Field of Classification Search ................. 285/89, 285/355, 351, 347, 918, 143.1, 219, 220, 285/392
See application file for complete search history.

(56) References Cited

U.S. PATENT DOCUMENTS

| | | | | |
|---|---|---|---|---|
| 529,164 | A * | 11/1894 | Vanderman | 246/230 |
| 2,342,425 | A * | 2/1944 | Parker | 285/220 |
| 2,413,878 | A * | 1/1947 | Maky | 285/220 |
| 3,019,832 | A * | 2/1962 | Williams | 152/427 |
| 3,376,053 | A * | 4/1968 | Novakovich et al. | 285/92 |
| 3,589,192 | A * | 6/1971 | Sabovik | 136/230 |
| 4,067,404 | A * | 1/1978 | Crase | 175/75 |
| 4,289,334 | A * | 9/1981 | Riley | 285/55 |
| 4,898,201 | A * | 2/1990 | Conley et al. | 137/245.5 |
| 4,898,329 | A * | 2/1990 | Davis et al. | 239/13 |
| 5,110,160 | A | 5/1992 | Brozovic | |
| 5,509,697 | A * | 4/1996 | Phillips et al. | 285/136.1 |
| 6,045,166 | A * | 4/2000 | Krause | 285/347 |
| 7,070,208 | B2* | 7/2006 | Richey et al. | 285/220 |
| 2001/0045748 | A1* | 11/2001 | Muto | 285/308 |
| 2004/0021009 | A1* | 2/2004 | Glaser et al. | 239/533.2 |

* cited by examiner

*Primary Examiner*—Robert J. Sandy
*Assistant Examiner*—Jay R Ripley
(74) *Attorney, Agent, or Firm*—Jeffrey P. Calfa; Jack D. Nimz

(57) ABSTRACT

A high pressure hydraulic fitting (300) includes a body (302) having a central passage (322), a channel (304), a threaded section (314), and an extension section (310), wherein the threaded section (314) is disposed between the channel (304) and the extension section (314), and wherein the central passage (322) fluidly connects a first distal end (303) with a second distal end (316) of the body (302). A first o-ring (306) is in the channel (304). A locking nut (324) is engaged to the body (302). The locking nut (324) has an internal threaded section (326) that is arranged to mate with the threaded section (314) on the body (302).

3 Claims, 3 Drawing Sheets

FIG. 5
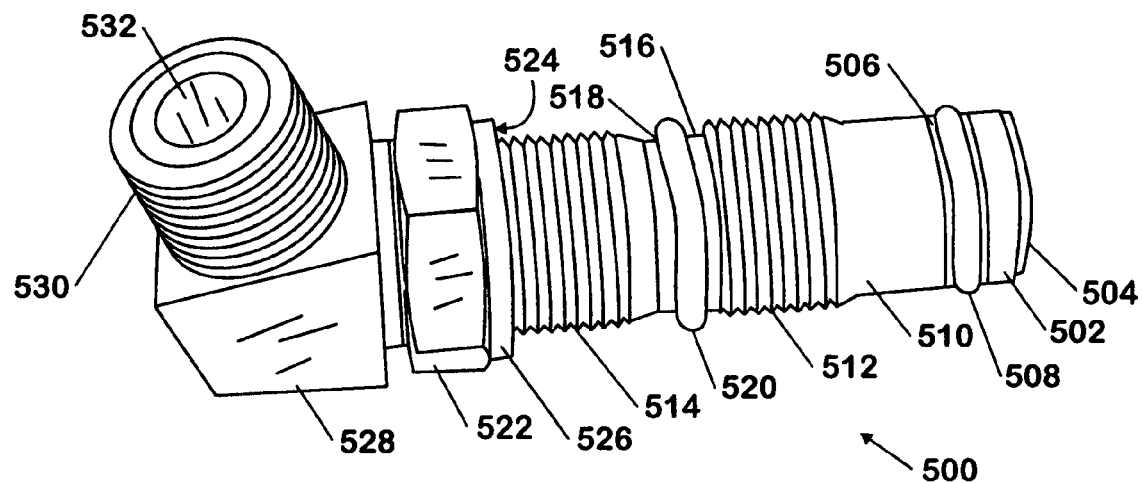
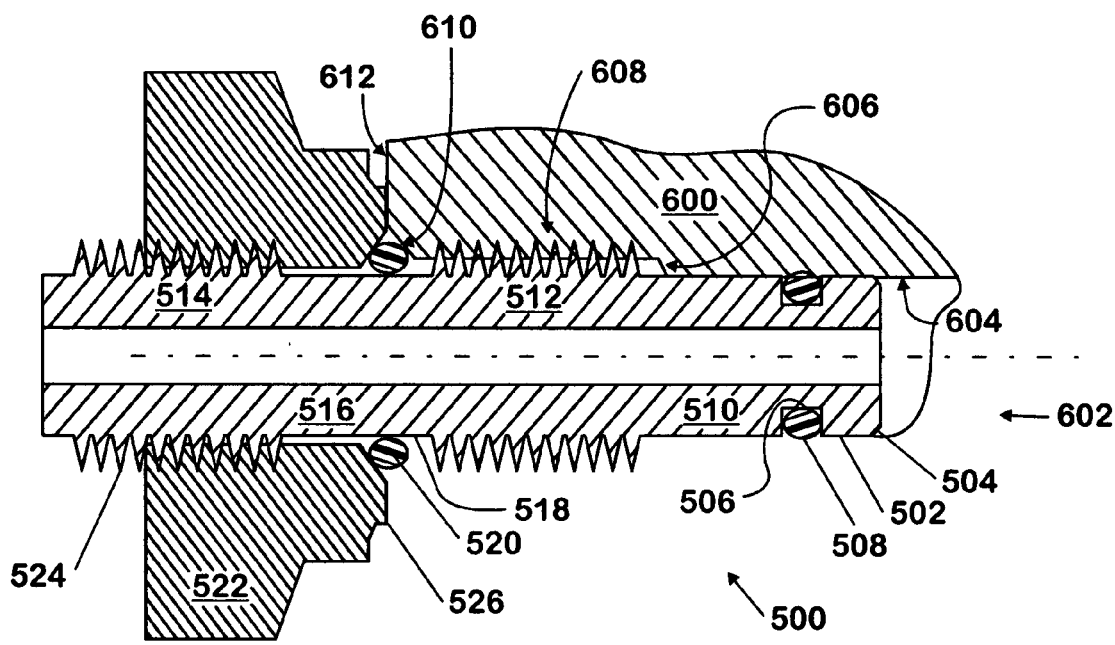
FIG. 6

HYDRAULIC FITTING

FIELD OF THE INVENTION

This invention relates to hydraulic systems for internal combustion engines, including, but not limited to, hydraulic fittings used on diesel engines.

BACKGROUND OF THE INVENTION

High pressure fittings for hydraulic applications are known. In some applications having vibratory operational environments, for example, fittings used on internal combustion engines, the known fittings are prone to failure due to fractures and sealing issues. Standard hydraulic fitting designs for hydraulic systems are often not adequate for use on diesel engines due to special high loading conditions encountered only on diesel engines. Examples of known fittings can be found in standards maintained by the Society of Automotive Engineers (SAE). For example, fittings conforming to the SAE J-2244 standard may fail due to exposure of the threads to high pressure oil. Fittings conforming to the SAE J-2337 standard may fail due to high loads imparted to the fitting from engine vibrations, hose connections, hose loads, and hydraulic pressures.

Methods used in the past to improve performance of fittings include use of high strength materials and/or design features such as fillets intended to reduce or eliminate stress risers. One example of a high pressure fitting may also be found in U.S. Pat. No. 5,110,160 by Brozovic, published on May 5, 1992, the contents of which are incorporated herein in their entirety by reference. Another example is a fitting design that conforms to the SAE J-2337 standard. Such fittings are partially effective in withstanding operation on a diesel engine environment, but are complex and costly.

Accordingly, there is a need for a design for a high pressure hydraulic fitting that is not prone to the failures experienced by the known designs, and is simple and cost effective.

SUMMARY OF THE INVENTION

A simple and cost effective design for a high pressure hydraulic fitting that is not prone to the failures experienced by the known designs is described herein. The hydraulic fitting may include a body having a central passage, a channel, a threaded section, and an extension section. The threaded section may be located between the channel and the extension section. The central passage may fluidly connect a first distal end with a second distal end of the body. A first o-ring may be located the channel. A locking nut may be engaged to the body. The locking nut may have an internal threaded section that is arranged to mate with the threaded section on the body. The new design avoids thin cross sections and high stress areas in the body, and is advantageously configured for compatibility with existing bore configurations, for example, bores conforming to the SAE J-2337 standard. The embodiments described herein may also advantageously be configured to accommodate seals of larger diameters than those specified in the SAE standards, enabling use of the fittings in applications with higher service pressures.

A high pressure hydraulic connection using the design described herein includes a component having a bore, the bore having a lead-in section, a tapered section located adjacent to the lead-in section, a threaded section located adjacent to the tapered section, and a chamfer section adjacent to the threaded section and to a mouth of the bore. A fitting that is insertable into the bore has an internal passage, and includes a body having a lead in portion, a channel located adjacent to the lead in portion, a threaded portion located adjacent to the channel, an extension portion located adjacent to the threaded portion, and a locking nut located on the body. An internal threaded portion of the locking nut operably engages the threaded portion of the body a first o-ring may be located in the channel. When the fitting is connected to the component, the lead in portion is placed in the lead in section, the threaded portion is engaged with the threaded section, and the locking nut is in contact with the component.

A hydraulic connection for a diesel engine advantageously includes a bore formed in the diesel engine component. The bore includes a lead-in section, a tapered section, a threaded section, and a chamber surrounding a mouth of the bore. A fitting may be inserted and connected to the bore. The fitting may include a lead-in portion having a channel, a first o-ring placed in the channel, a first threaded portion, an extension portion having a second o-ring placed thereon, a second threaded portion, and a locking-nut operably engaged with the second threaded portion. When the fitting is connected to the component, the lead-in portion is in the lead-in section, the first o-ring sealably engages the lead-in section, the first threaded portion is engaged with the threaded section, and the second o-ring sealably engages the chamfer and the locking-nut. A sealed thread volume may advantageously be defined between the threaded section, the threaded portion, the first o-ring, and the second o-ring.

BRIEF DESCRIPTION OF THE DRAWINGS

FIG. 5 is a perspective view of an alternative embodiment of a hydraulic fitting in accordance with the invention.

FIG. 6 is a cross-section of the hydraulic fitting shown in FIG. 5 as installed in a bore that conforms with the SAE-2337 standard.

DESCRIPTION OF A PREFERRED EMBODIMENT

Figure 1:
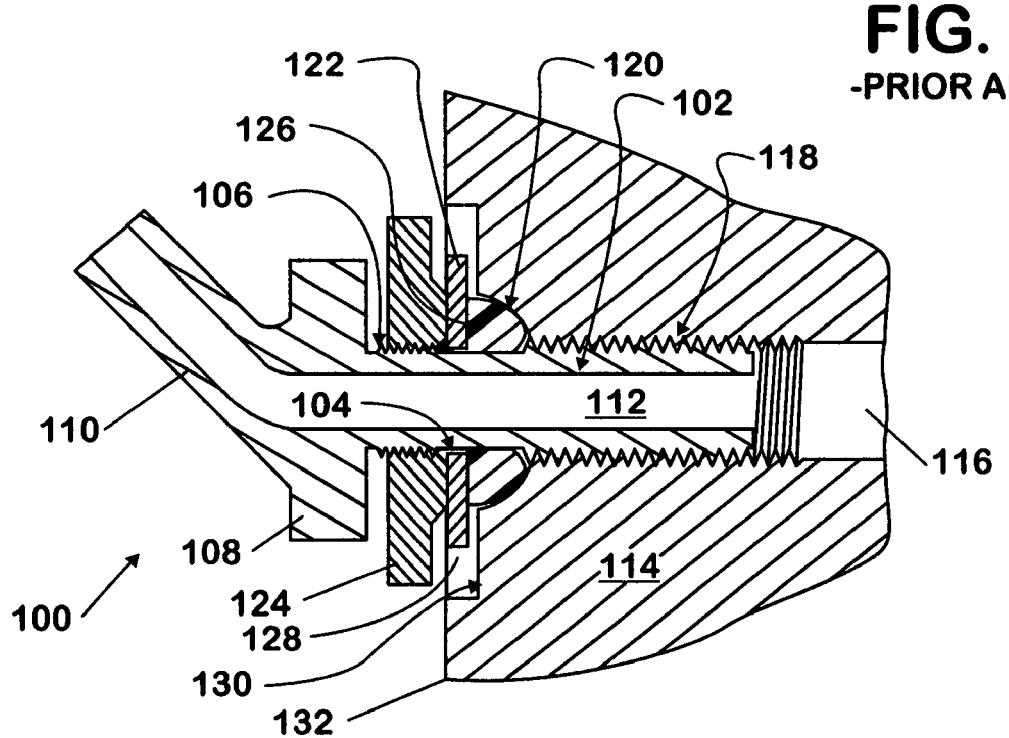
FIG. 1 is a cross-section of a known hydraulic connection that conforms to the SAE J9-1926 and J-2244 standards.

A known hydraulic fitting 100 is shown in cross section in FIG. 1. The fitting 100 may conform with SAE standards J-1926 and/or J-2244. The fitting 100 includes a mounting threaded section 102, a shank or circumferential channel portion 104, a jam-nut threaded section 106, a head section 108, and an outlet section 110, all connected to each other along and around an internal passage 112 extending clear through the fitting 100. The threaded section 102 is constructed for insertion and attachment into a receiving component 114. The receiving component 114 has an opening, bore, or hole 116 for receiving the fitting 100 thereinto. The bore 116 may have a threaded section 118 arranged to mate with the threaded section 102. Adjacent to the threaded section 118 may be a chamfer section 120 that is arranged to be close to the shank section 104 when the fitting 100 is connected to the component 114.

A seal compression or retention ring 122 that is shaped as a washer may be assembled onto the fitting 100. A backing nut 124 may be threaded onto the section 106 of the fitting 100 and arranged to secure the seal ring 122 against a seal 126. The seal 126 may be located in a space between the seal ring 122, the chamfer 120, and the shank section 104 of the fitting 100. Advancement of the backing nut 124 may push the seal ring 122 toward the seal 126 thus increasing a compression of the seal 126 and accomplishing a sealing effect that avoids leakage of a fluid present in the bore 116 of the component 116 to the environment. In some implementations, a channel 128 may be formed in the component 114 that provides a surface 130 that is recessed with respect to an outer surface 132 of the component 114. The recessed surface 130 may serve as a stop surface for the ring 122 during assembly and tightening of the nut 124 onto the fitting 100.

There are two main disadvantages with the design of the fitting 100. First, the threaded portion 102 is continuously exposed to a fluid contained in the bore 116 that passes through the passage 112. In the case when the fluid is oil, the threaded portion 102 is constantly wetted by the oil in the passage 112 and in the bore 116 that is under high pressure and may carry contaminants, corrosive and otherwise, such as foreign particles, water, fuel, sulfur, and so forth. Specifically in diesel engines, the hydraulic pressure in the bore 116 may be highly dynamic and subject the threaded sections 102 and 118 to pulsating or dynamic pressures. Pulsating or dynamic pressures are known to and may cause failures or fractures in the threaded sections 102 and/or 118. Second, a cross-sectional area of the shank 104 is small to accommodate adequate space for the seal 126, and is surrounded by sharp edges (the threaded sections 102 and 106) making it prone to fracture due to fatigue failure of the material (typically metal) making up the fitting 100.

Figure 2:
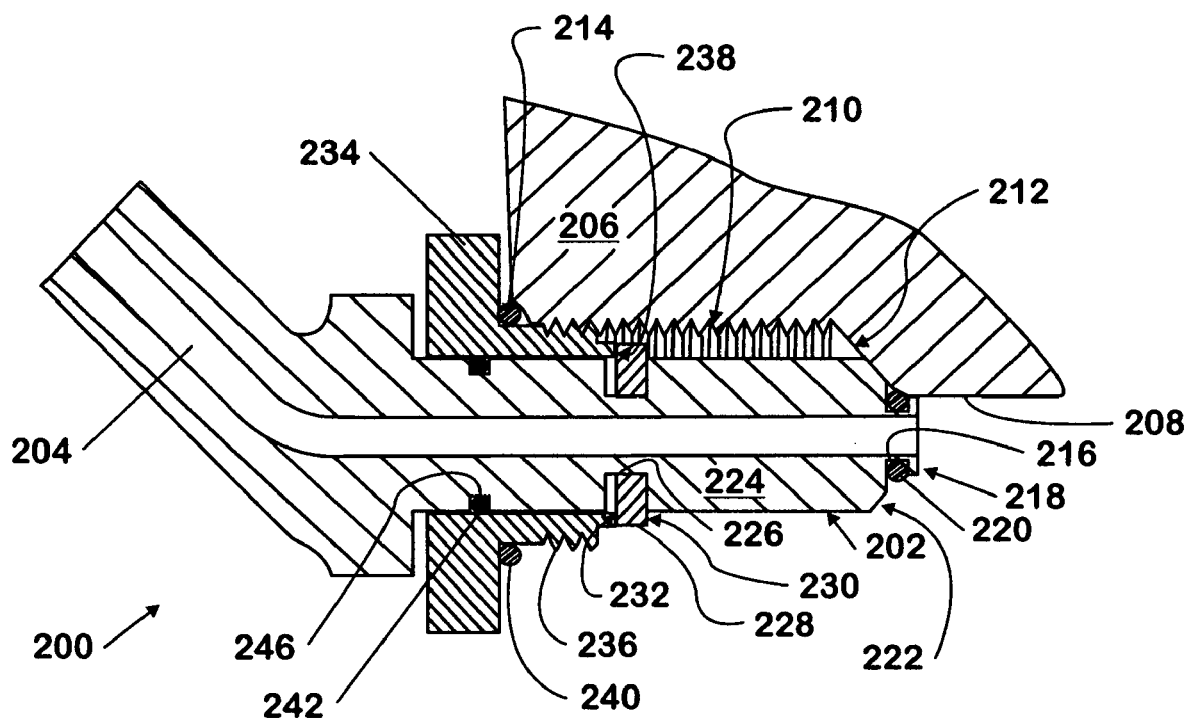
FIG. 2 is a cross-section of a known hydraulic connection that conforms to the SAE J-2337 standard.

An alternative design for a known fitting 200 is shown in cross section in FIG. 2. The fitting 200 may conform with SAE standard J-2337. The fitting 200 has a body section 202 surrounding a central passage 204 for passage of fluid therethrough. The fitting 200 is shown assembled onto a component 206 having a bore 208 (partially shown for clarity). The bore 208 has a threaded section 210 which has a tapered surface 212 on an inner end, and a chamfer 214 on an outer end. The threaded section 210 may be arranged to retain the fitting 200 therein. The body section 202 of the fitting 200 includes a channel 216 at a distal end 218 that is inserted into the bore 208. The channel 216 may include a first o-ring 220 therein that is arranged to create a seal between a peripheral inner wall of the bore 208 and the body section 202. The body 202 may have a tapered section 222 adjacent to the channel 216 that is appropriately sized to correspond to the shape of the tapered section 212 and help locate the fitting 200 when it is inserted into the component 206 by touching the tapered section 212.

An extension section 224 of the body 202 may extend between the tapered section 222 and a retainer channel 226 that is formed in the body 202. The channel 226 may extend along an entire circumference of the body 202, and may have a rectangular cross-sectional shape. A retainer 228 may be located in the channel 226. The retainer 228 is shown having a rectangular cross-section to correspond the rectangular cross section shape of the channel 226. Other cross-sectional shapes of retainers and/or channels may advantageously be used.

The retainer 228 may have an inner flat surface 230 and an outer flat surface 232. When the fitting 200 is assembled into the component 206, the retainer 228 may be pressed onto a side wall of the channel 226 through the surface 230. A pressing force may be imparted onto the retainer 228 through the flat surface 232 by a retention nut 234.

The retention nut 234 may have an external threaded section 236 that is arranged to have threads formed thereon that mate with threads formed on the threaded section 210 of the component 206. When the nut 234 is inserted into the component 206, an innermost surface 238 of the nut 234 may touch and push on the flat surface 232 to retain the fitting 200 in the bore 208. A second o-ring 240 may create a seal between the nut 234 and the chamfer section 214 of the bore 208. A third o-ring 242 may be located in a second channel 246 formed in a second extension body section 248 of the body 202, and may form a seal between the nut 234 and the body 202.

The fitting 200 is capable of sealing the threaded section 210 from a high pressure fluid in the bore 208 with the o-ring 220. The threaded section 210 is further sealed from ingress of debris and humidity from the external environment by the O-rings 240 and 242. One disadvantage of the fitting 200 is the relatively large number of components and seals that are required. Another disadvantage of the design of the fitting 200 is the presence of relatively thin cross sections of the body 202, for example, at the channels 216 and 226, which make the body 202 prone to fatigue fractures when exposed to cyclic pressure loading from the fluid in bore 208 during operation of the engine, as is often present in such applications on internal combustion engines. Specifically on diesel engines, thin cross-sections of the fitting, for example, the areas close to the channel 226, may fail due to static loads and/or dynamic loads imparted by another engine component such as a high pressure hose (not shown) that may be connected to the fitting 200 and used to deliver or receive high pressure fluid through the fitting 200.

Figure 3:
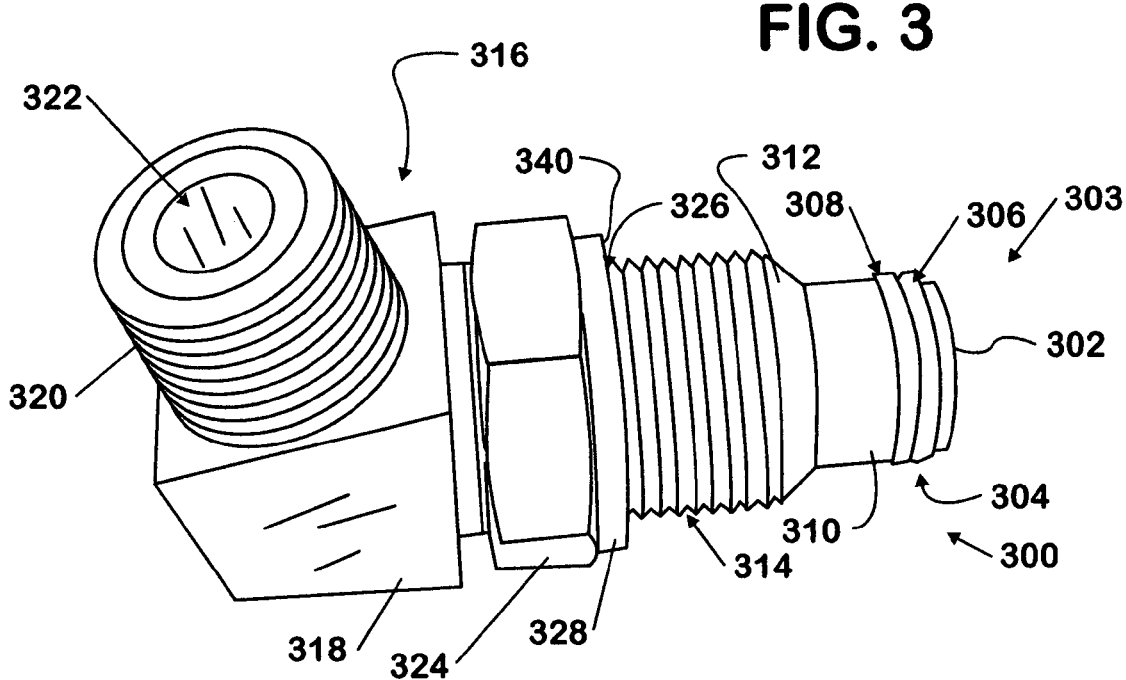
FIG. 3 is perspective view of a hydraulic fitting in accordance with the invention.

The deficiencies in the design of the known fittings presented thus far, and other known fittings, may be rectified. A design for a fitting 300 that is not prone to the deficiencies of known fittings is shown in FIG. 3. The fitting 300 has a body 302 having a channel 304 close to a distal end 303. The channel 304 may contain an o-ring 306 and a backing ring 308. The backing ring 308 may be arranged to face the o-ring 306 on an exterior side, or, away from the end 303 of the body 302. An extension section 310 may separate the channel 304 from a tapered section 312 that may connect an outer diameter size of the extension section 310 to an outer diameter of a threaded section 314. The threaded section 314 may extend between the tapered section 312 to a transition section 314 located on an exterior side 316 of the fitting 300.

The exterior side 316 of the fitting 300 may include a turn section 318, and an outlet fitting section 320. The turn section 318 may be oriented to an appropriate angle to facilitate connection of the fitting 300 to an other engine component (not shown), and may have an angle anywhere within a range of about 0 degrees to 90 degrees, but other angles may be used as appropriate.

The fitting 300 may have a passage 322 formed along an entire length thereof, that may fluidly connect the distal end 303 with the outlet fitting section 320. A lock-nut 324 may have an internal thread 326 (shown in cross section in FIG. 4) that is arranged to mate with a thread pattern of the threaded section 314 of the fitting 300. The lock nut may additionally be installed onto the fitting 300 with a lock portion 328 thereon that is oriented toward the end 303 of the fitting 300. The lock portion 328 of the nut 324 may have a flat surface 340 formed thereon.

Figure 4:
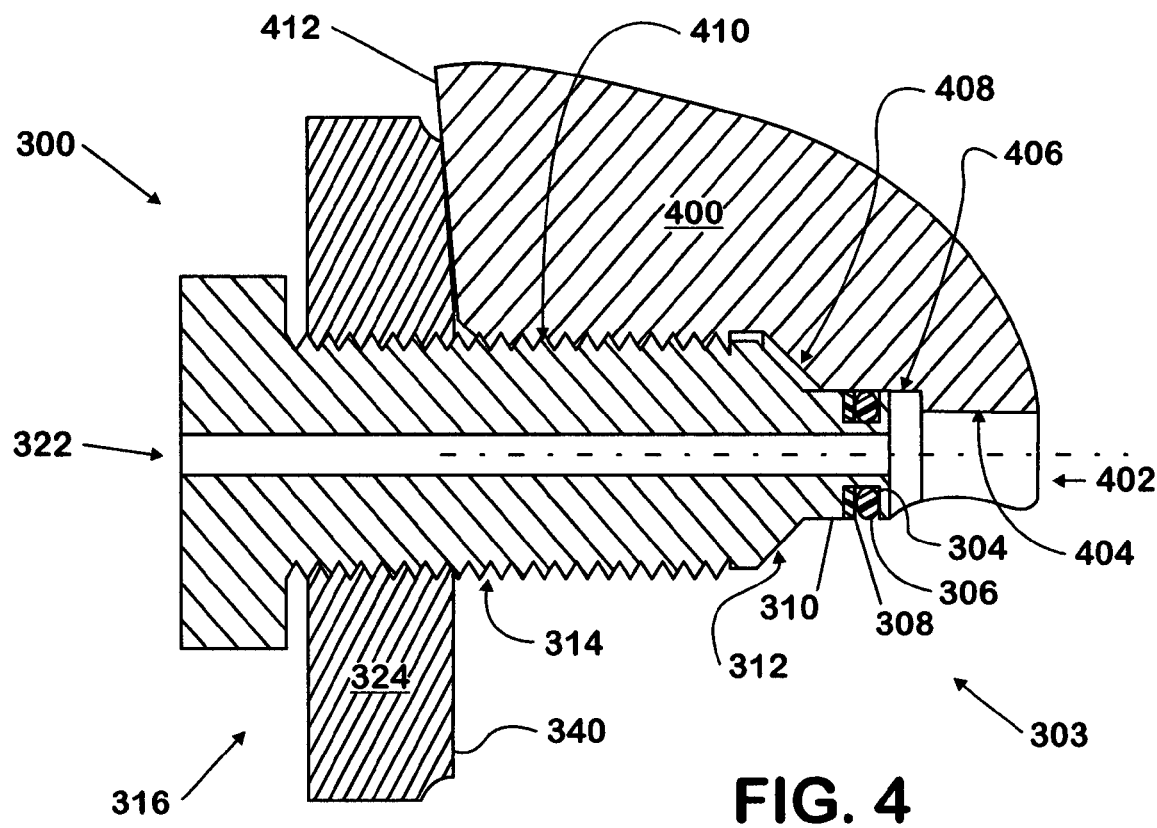
FIG. 4 is a cross-section of the hydraulic fitting shown in FIG. 3 as installed in a bore that conforms with the SAE-2337 standard.

A cross section view of the fitting 300 shown in FIG. 3, installed into an engine component 400, is shown in FIG. 4. The component 400 has a bore 402 for connection of the fitting 300. The bore 402 may be part of a fluid system on an engine that contains a fluid, for example engine oil, fuel, and so forth, that may be under a high pressure during operation of the engine. The bore 402 may have a supply passage 404 that is fluidly connected to the fluid system. The bore 402 may have a sealing surface 406 that is located adjacent to the o-ring 306 when the fitting 300 has been inserted into the bore 402. The surface 406 may have features, such as an inner diameter size, flatness, smoothness, and so forth that are appropriate for sealable contact with the o-ring 306. A size of the backing ring 308 may be appropriate for insertion of the ring 308 within the surface 406 of the bore 402 for provision of an adequate compression of the o-ring 306 between the channel 304, the ring 308, and the surface 406.

The bore 402 may additionally have a tapered section 408 adjacent to the surface 406. The tapered section 408 may serve as a stop point during insertion of the fitting 300 into the component 400, and may help compress the o-ring 306 to smoothly transition into the surface 406 during installation of the fitting 300 into the component 400.

The bore 402 has a threaded section 410 adjacent to the tapered section 408. The threaded section 410 may be arranged to engageably mate with the threads on the threaded section 314 on the fitting body 302. The threaded section 410 on the component 400 may extend between the tapered section 408 up to an external surface 412 that surrounds an opening of the bore 402. The surface 412 also serves as a contact point for the flat surface 340 on the nut 324 that enables tightening of the nut 324 onto the fitting body 302 when the fitting 300 has been installed into the component 400.

The fitting 300 advantageously has a substantially uninterrupted cross section along an entire length of the body 302. Unlike the fittings 100 and 200 described above, there are advantageously no channels that compromise a fatigue strength by intersecting the body 302 along a load bearing section of the body 302, the load bearing section defined as any section of the body 302 having external threads formed thereon, or, any portion of the body 302 thereof being surrounded by threaded sections, that is responsible for providing the mechanical interconnection(s) between the fitting 300 and the component 400.

The fitting 300 may advantageously be used at an engine location that is not susceptible to contamination by debris or humidity because, even though the threaded section 314 of the fitting is sealed from fluid in the bore 402 by the o-ring 306, it is not sealed by a seal from the environment. Sealing of the threaded section 314 from the environment is accomplished partially by a close fit between the surface 340 on the nut 324 and the surface 412 on the component 400. An alternative embodiment of a robust fitting that is able to seal a threaded section is described below.

An outline view of an alternative embodiment for a fitting 500 is shown in FIG. 5. The fitting 500 may have a lead-in section 502 located on a distal of a body 501 of the fitting 500 that leads the fitting 500 into a bore of a component (shown in FIG. 6 below). The lead-in section 502 may be substantially cylindrical and may serve as a pilot feature that guides the fitting 500 into the bore. The lead-in section 502 may have a lead-in chamfer 504 on one side, and be adjacent to a channel or groove 506 on another side. The lead-in chamfer 504 may guide and align the section 502 for proper installation during insertion of the fitting 500 into a corresponding port. The channel 506 may contain a first o-ring 508.

Adjacent to the channel 506 may be an extension portion 510 formed on the body 501 of the fitting 500 that separates the channel 506 from a first threaded section 512. The first threaded section 512 may be separated from a second threaded section 514 by a second extension section 516. The second extension section 516 may have a channel or groove 518 formed therein that may advantageously contain a second o-ring 520. The first o-ring 508 and the second o-ring 520 are shown as having different sizes, but may alternatively have the same or similar sizes.

A locking nut 522 having an internal threaded section 524 and a locking feature 526 may be operably threaded onto the second threaded section 514 of the fitting 500. The second threaded section 514 may extend up to a bend or turn section 528. The turn section 528 may be oriented to an appropriate angle to facilitate connection of the fitting 500 to an other engine component (not shown), and may have an angle anywhere within a range of about 0 degrees to 90 degrees, but other angles may be used as appropriate. An outlet fitting section 530 may be connected to the turn section 528. The outlet fitting section 530 may be arranged to interface with another engine component (not shown) that requires fluid communication through a passage 532 in the fitting 500 to a fluid system on the engine. The passage 532 may extend along an entire length of the fitting 500.

A cross section view of the fitting 500 shown in FIG. 5 is shown in FIG. 6 where the fitting 500 is shown installed in an engine component 600, which is shown in partial cross section for the sake of clarity. The engine component 600 may have a bore 602 having four sections. A first section 604 may be a straight bore arranged for a close-fit around the lead-in section 502 of the fitting 500. The first section 604 may additionally be arranged to compress the o-ring 508 on the fitting 500 during installation and accomplish a sealable engagement therewith. The first section 604 may form an entry chamfer 606 on one end that may help compress the o-ring 508 and align the section 502 during insertion of the fitting 500 into the bore 602.

The bore 602 may have a threaded section 608 having a thread pattern arranged to match the threaded section 512 on the fitting 500. An inlet chamfer 610 may be located at a mouth of the bore 602 and arranged to sealably contain a portion of the o-ring 520 when the fitting 500 is installed in the component 600. An outer surface 612 of the component 600 in an area adjacent to the bore 602 may surround an opening of the bore 602 and serve as a stop during installation of the nut 522.

The fittings 300 and 500 described thus far are advantageous over the known fittings used, for example the fittings 100 and 200 described above, in that they offer a simple design solution that is superior in addressing issues present with the known fittings. Each of the fittings 300 and 500 has a mostly uniform cross-section in their body sections so as to avoid stress concentration areas that may lead to fracture failures when the fittings are cyclically loaded during operation. Moreover, the fittings 300 and 500 have simple designs in that they do not require retainer rings as the other designs do. Additionally, the fitting 500 may advantageously be installed into a bore that conforms with the existing SAE J-2337 standard, for example, the bore formed in component 206 shown in FIG. 2. This flexibility in application may mean that implementation of the fitting 500 may advantageously be made transparent to a user currently using a fitting 200. Alternatively, the bore 406 and the corresponding extension section 310 and the o-ring 306 may be made of a larger diameter than specified in the SAE J-2337 standard in order to improve the sealing capability of the fitting 300. This increased sealing capability may advantageously allow for use of the fitting 300 for higher service pressures than fittings conforming to the SAE J-2337 standard without increasing an overall size of the hydraulic interface that includes the fitting 300.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A combination of a fitting and a part, the fitting is fit to a bore in a part and enables the bore to have fluid communication through the fitting, wherein:
   the bore in the part comprises, in axial succession toward an end of the bore, a first section that is straight and joins a second section that has a taper expanding toward the end of the bore to join with a third section that is straight;
   the fitting comprises a solid body circumscribing a central through-passage to which the bore communicates;
   a distal end of the solid body comprises a straight first section disposed within the first section of the bore;
   the solid body comprises a tapered second section joining the straight first section of the solid body and a straight third section of the solid body, with the second section of the solid body being disposed within the second section of the bore and the third straight section of the solid body disposed within the third section of the bore;
   a seal is disposed in a channel in the straight first section of the solid body to seal between an outside of the filling and the bore;
   a screw thread in the third section of the fitting threads the fitting to a screw thread in the third section of the bore;
   and a nut is threaded to a threaded portion of the fitting third section protruding from the end of the bore and is tightened against an exterior surface of the part surrounding the end of the bore.

2. The combination of a fitting and a part as set forth in claim 1 wherein a backing ring is disposed in the channel to back the seal.

3. The combination of a fitting and a part as set forth in claim 1 wherein the central through-passage ends at an outlet connection beyond the nut in the portion of the fitting protruding from the end of the bore.

* * * * *